United States Patent [19]

Andolora

[11] Patent Number: 4,913,599
[45] Date of Patent: Apr. 3, 1990

[54] DRILL FOR FLEXOGRAPHIC PLATES AND NEGATIVES

[75] Inventor: Joseph A. Andolora, Caledonia, N.Y.

[73] Assignee: Adflex Corporation, Rochester, N.Y.

[21] Appl. No.: 179,201

[22] Filed: Apr. 8, 1988

[51] Int. Cl.⁴ .............................................. B23B 41/00
[52] U.S. Cl. ........................................ 408/48; 408/50; 408/51; 408/53; 408/68; 408/69; 408/202
[58] Field of Search .................. 408/31, 42, 9, 49, 50, 408/51, 52, 53, 69, 68, 202, 204, 207

[56] References Cited

U.S. PATENT DOCUMENTS

| | | |
|---|---|---|
| 2,250,845 | 7/1941 | Stefano . |
| 2,997,900 | 8/1961 | Pugsley . |
| 3,066,554 | 12/1962 | Hanson ................................ 408/205 |
| 3,264,906 | 8/1966 | Swords . |
| 3,266,343 | 8/1966 | Jellig ..................................... 408/88 |
| 3,348,248 | 10/1967 | Milkert . |
| 3,574,946 | 4/1971 | Mayston ............................. 408/204 |
| 3,592,553 | 7/1971 | Heizer . |
| 3,801,090 | 4/1974 | Gillen . |
| 3,899,264 | 8/1975 | Tobias .................................. 408/68 |
| 3,973,863 | 8/1976 | Smith .................................... 408/31 |
| 4,039,266 | 8/1977 | O'Connell . |
| 4,185,943 | 1/1980 | Hautau . |
| 4,342,088 | 7/1982 | Sato . |
| 4,419,803 | 12/1983 | Thornton et al. .................... 408/42 |
| 4,589,807 | 5/1986 | Martin . |
| 4,705,436 | 11/1987 | Robertson . |
| 4,749,314 | 6/1988 | Le Blond ............................. 408/68 |

FOREIGN PATENT DOCUMENTS

| | | | |
|---|---|---|---|
| 19309 | 1/1987 | Japan .................................... 408/31 |
| 654356 | 3/1979 | U.S.S.R. ............................... 408/42 |

Primary Examiner—Daniel Howell
Attorney, Agent, or Firm—Stonebraker, Shepard & Stephens

[57] ABSTRACT

A drill (10) for flexographic plates and negatives includes a table (15) movable in a Y direction under a drill bar (30), and a pin bar (25) movable in an X direction on the table so that negatives can be supported on the table, moved to an appropriate positon underneath the drill bar, and held in place by clamping the table and the pin bar. Drill bar (30) moves up and down and rotates a linear array of hollow spindles (35) holding hollow drill bits (40) for boring a suitable array of holes. The same array bored in the negatives is then bored in a flexographic plate corresponding to each negative, and these are pinned together while the plates are imaged. Drill (10) includes slug rods (32) extending downward through spindles (35) and bits (40) to push out drilled slugs when the drill bar raises. The spindles are preferably rotated by a drive chain (55).

21 Claims, 5 Drawing Sheets

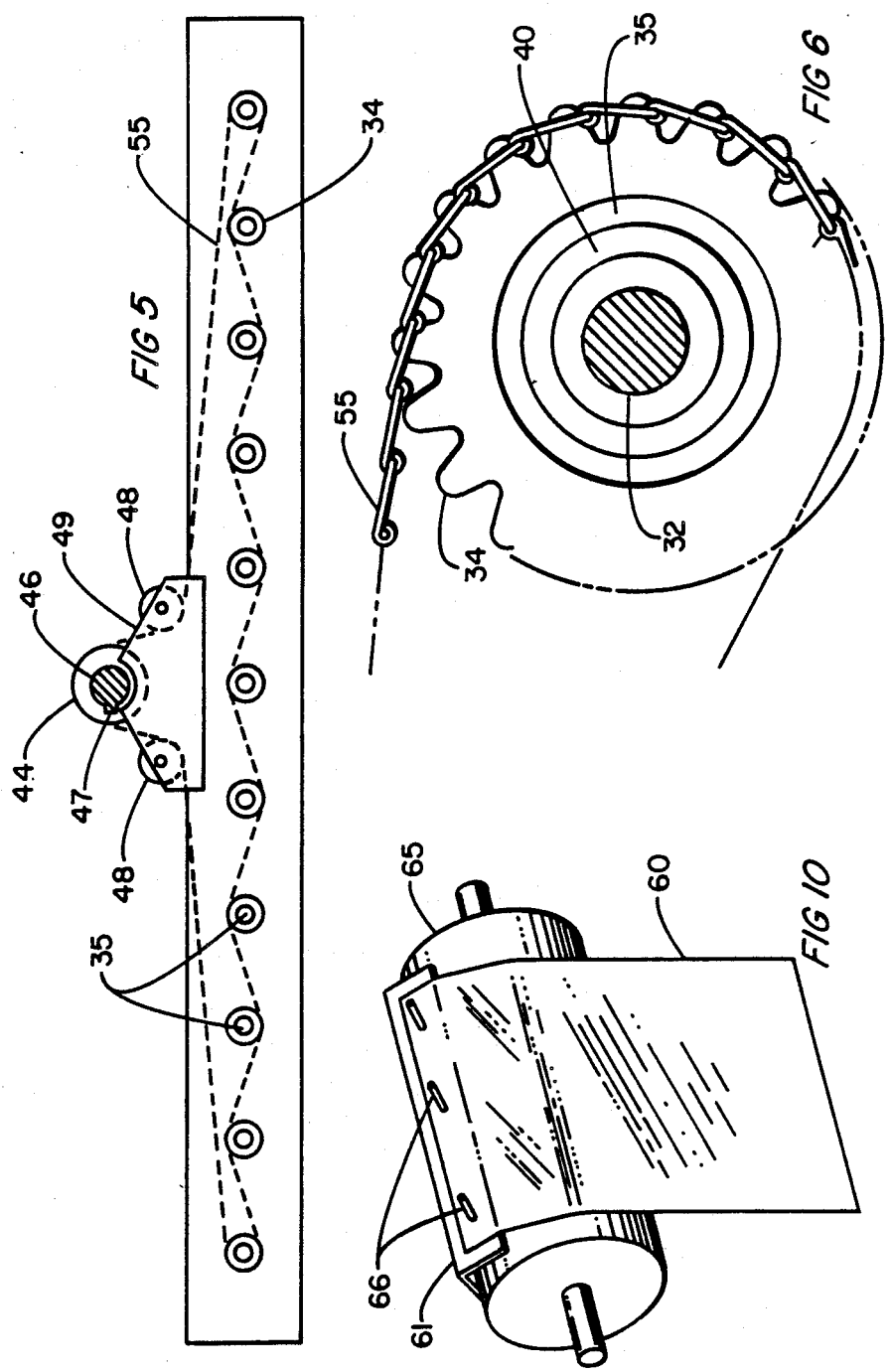

DRILL FOR FLEXOGRAPHIC PLATES AND NEGATIVES

BACKGROUND

Flexographic plates and negatives are drilled with linear arrays of holes that can fit a standard pin bar used for mounting the plates on cylinders. The holes also serve to position a negative over a plate, while the plate is being imaged. For the drills that have been devised for drilling such hole arrays, it has been inconvenient to position a work piece accurately under the drill array, to select from the array the drills to be used, to remove slugs from the drill bits, and to sharpen and replace drill bits. Also, prior art drills for flexographic purposes have been very expensive.

I have devised a drill for flexographic plates and negatives that is much more convenient to use, while also being much less expensive. My drill conveniently positions negatives under the drill array, makes drill selection fast and simple, automatically removes slugs from drill bits, and allows quick and easy replacement and sharpening of drill bits. It safely, quickly, and reliably performs every operation desired and does this at a price less than half of what previous flexographic drills have cost.

SUMMARY OF THE INVENTION

My drill for flexographic plates and negatives has a linear array of drill bits rotatably arranged along a drill bar that is movable vertically above a table. A bearing system supports the table for movement in a Y direction underneath the drill bar, and a clamp allows clamping of the table in any Y direction position. A pin bar, fitting the negatives, is mounted on the table to be movable in an X direction, and a clamp locks the pin bar and negative in any X direction position on the table. A motor system raises and lowers the drill bar and rotates the drill bits for drilling a selected array of holes in flexographic plates and negatives supported on the table. A single or a complete set of negatives can be clamped in position and drilled in a single operation, and the same array of holes can be drilled in a flexographic plate for each negative. The negatives can be pinned to the plates via the drill holes, during imaging of the plates, and the holes in the plates can support them on a pin bar as the plates are mounted on a printing cylinder. The ability of the drill to hold the negatives square during the drilling operation assures that the plates are mounted square on the cylinders so that they operate in registry in the press.

Each of the drill spindles is hollow, has a sprocket for a chain drive, and has a collet for holding a drill bit. Each drill bit is also hollow and has an adjustable stop collar abutting against the spindle collet for holding the drill at a proper height. A slug removal rod, adjustably positioned in a frame supporting the drill bar, extends down through each spindle for removing drill slugs when the drill bar raises. A motor turning a drive sprocket moves a chain that wraps alternately around the spindle sprockets for rotating adjacent spindles in opposite directions. The drill bar is raised and lowered in response to operator control by a pair of pneumatic cylinders. Operation of these components is semi-automatic and is quick, safe, and reliable.

DRAWINGS

FIG. 5 is a partially schematic, plan view of a preferred chain drive for the spindles of the drill of FIGS. 1-3.

FIG. 6 is a partially schematic, enlarged view of the left end spindle from the drive of FIG. 5.

FIG. 10 is a perspective view of a flexographic plate with a hole array drilled according to my invention, being mounted on a print cylinder by means of a pin bar.

DETAILED DESCRIPTION

Figure 1:
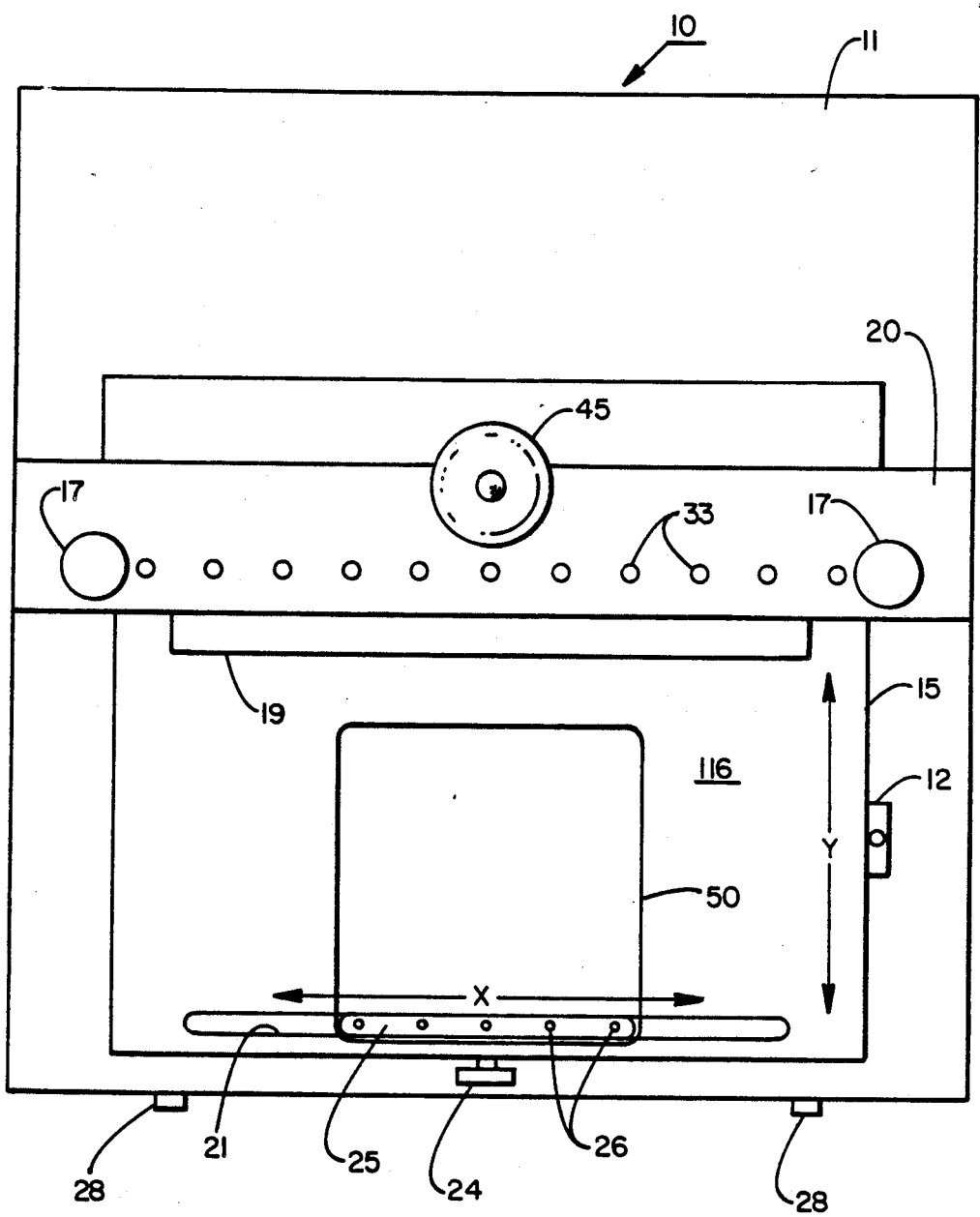
FIG. 1 is a partially schematic, plan view of a preferred embodiment of my drill.
Figure 2:
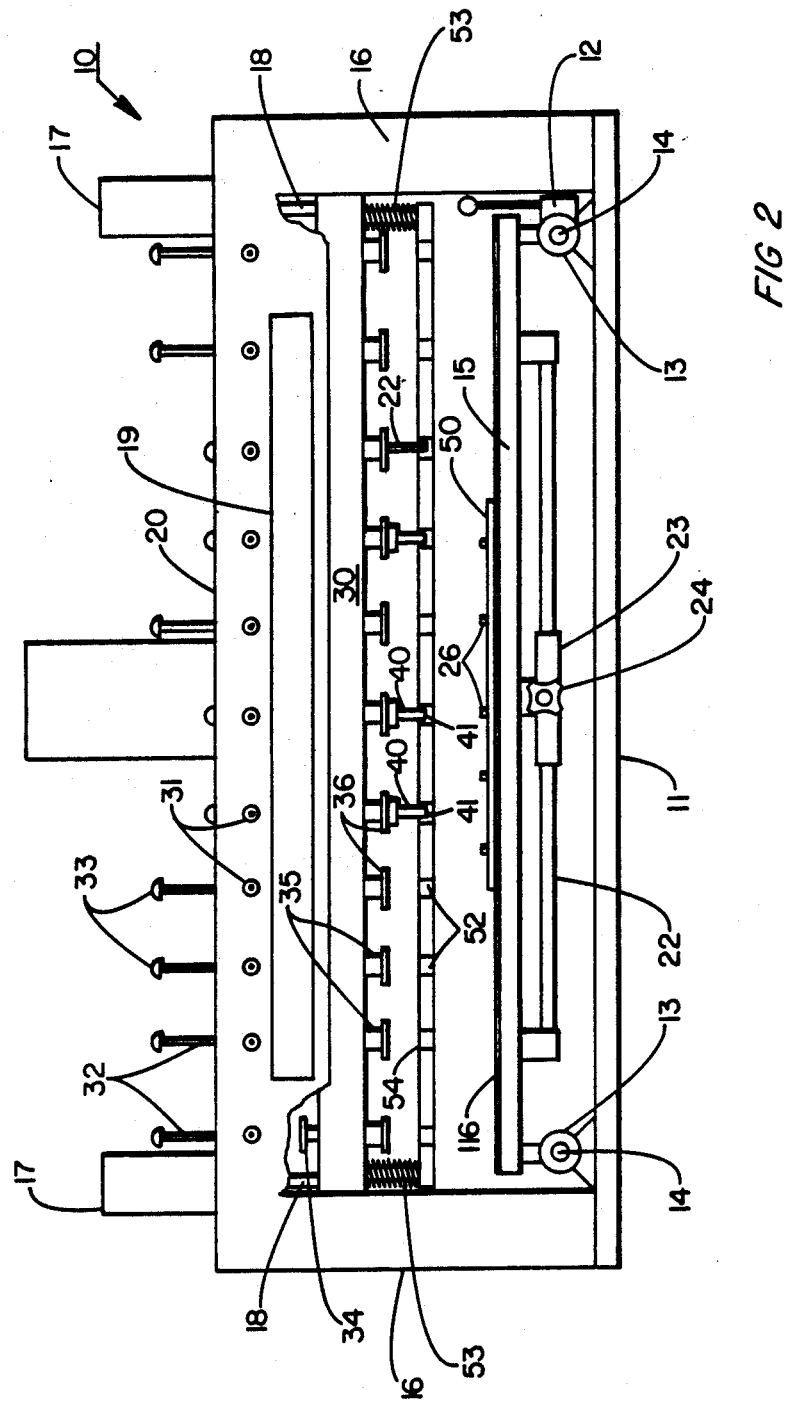
FIG. 2 is a partially schematic, front elevational view of the drill of FIG. 1.
Figure 3:
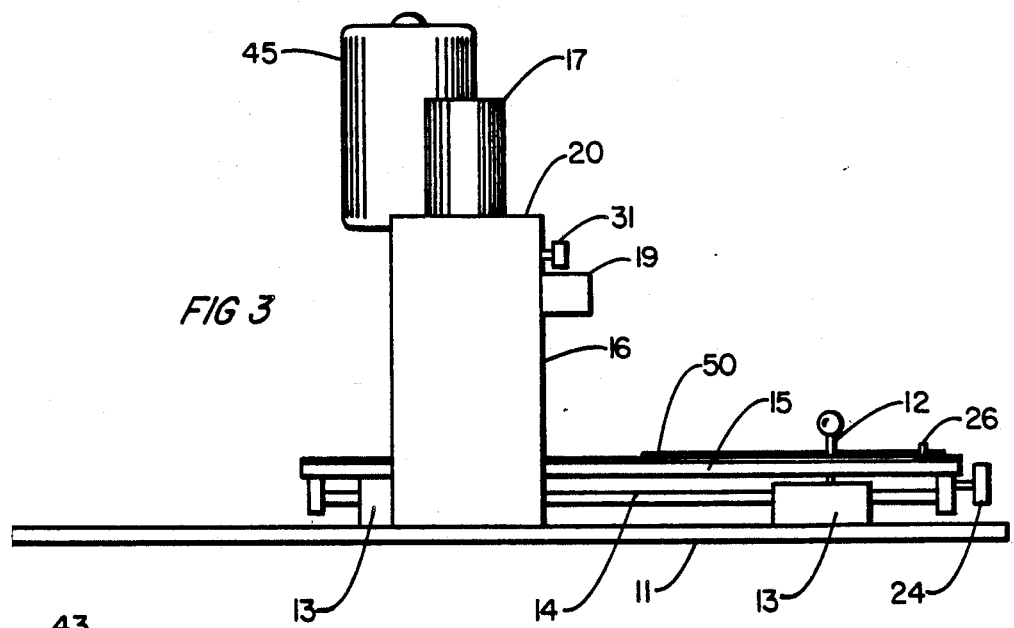
FIG. 3 is a partially schematic, side elevational view of the drill of FIGS. 1 and 2.

My drill 10, as shown in FIGS. 1-3, includes a supporting platform 11, preferably mounted on legs to set the drill at bench height, and a drill table 15 mounted above platform 11. The underside of table 15 has guide rods 14 that slide in bearings 13 mounted on platform 11 so that table 15 can move in a Y direction, as indicated by an arrow in FIG. 1.

A pair of side posts 16 rise above platform 11 on opposite sides of table 15 to support a frame 20 and a drill bar 30 extending between posts 16 above table 15. Drill bar 30 moves up and down relative to frame 20 and table 15, in response to a pair or air cylinders 17 operating vertically movable rods 18. The stroke of cylinders 17 is sufficient to move drill bar 30 down into a drilling position above table 15 and upward clear of table 15. A light 19, on the front of frame 20, illuminates the region of table 15 underneath drill bar 30. Motors or motive systems other than air cylinders 17 can also be arranged for moving drill bar 30 up and down.

Figure 8:
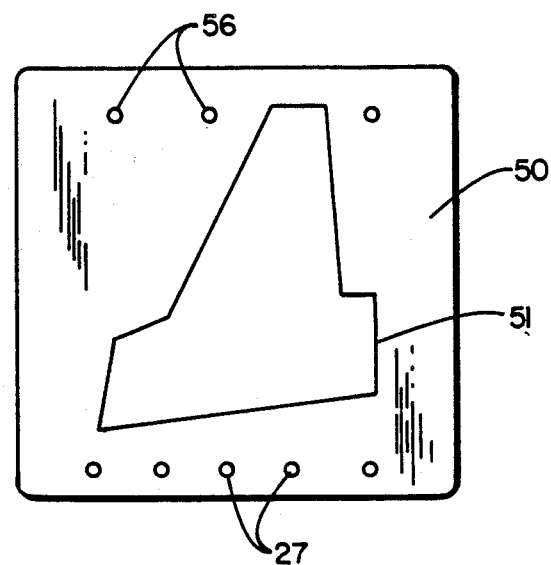
FIG. 8 is a plan view of a negative drilled according to my invention with a hole array outside an image area.

Fitting into a slot 21 along the front edge of table 15, is a pin bar 25 bearing pins 26 spaced in a row that is standard for flexographic negatives. A negative 50 has a row of holes 27 (FIG. 8) punched along one edge, and these holes fit over pins 26 on pin bar 25, so that negative 50 is supported on table 15. A guide bar 22 underneath table 15 is parallel with slot 21, and a guide 23, secured to pin bar 25, slides along guide 22. Pin bat 25 can be clamped in any X direction position, as indicated by the arrow in FIG. 1, by tightening clamp 24 on guide 23.

Drill bar 30 holds a row of hollow drill spindles 35 arranged in a linear array and spaced apart in a variable configuration that is a standard for the flexographic printing industry. The spacing of spindles 35 ranges from approximately 2¾ inches to 3½ inches and varies along the length of the spindle array. This offers drills with variable spacing that can be selected to avoid image areas of a flexographic negative. Some negatives are drilled in a margin outside the image area, where drill spacing is less important.

Figure 4:
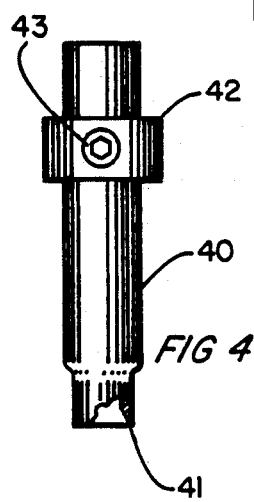
FIG. 4 is a partially cutaway, elevational view of a drill bit and stop collar for the drill of FIGS. 1-3.

Each spindle 35 has, at its lower end, a collet 36 that clamps and holds a hollow drill bit 40. As shown in FIG. 4, each drill bit 40 is a hollow tube sharpened internally at its lower end 41; and each carries a vertically adjustable collar 42 held in place by a set screw 43, to set the vertical height of cutting end 41. Collets 36 of spindles 35 are preferably all arranged at a common height above table 15, and each time a drill bit 40 is sharpened, and somewhat shortened, its collar 42 is adjusted to hold a uniform distance from collar 42 to tip 41. Then any drill 40 can be clamped in any spindle 35 with collar 42 abutting against collet 36 to dispose drilling tip 41 at a common height above table 15. When drill bar 30 lowers, all drilling tips 41 should be at a common height so that they all drill through the work piece, without drilling into table 15. For this purpose, a drillable work surface 116, preferably formed of paper, is arranged on the top surface of table 15.

Above drill bar 30, each drill spindle 35 has a chain sprocket 34 by which spindle 35 can be rotated in a bearing 37. A drive motor 45, mounted on frame 20, has a shaft 46, with a spline 47, extending below frame 20. A drive sprocket 44 is vertically movable on shaft 46 and rotates with shaft 46, by means of spline 47.

As best shown in FIGS. 5 and 6, a drive chain 55, wrapped around drive sprocket 44 by idler sprockets 48, meshes with each of the spindle sprockets 34, for rotating the spindles. This is preferably done by wrapping chain 55 alternately around spindle sprockets 34, as shown in FIG. 5, so that adjacent spindles 35 rotate in opposite directions. Since drill bits 40 are hollow tubes with cutting tips 41, the direction of their rotation does not affect their drilling ability.

A clevis 49, mounted on drill bar 30, straddles idler sprockets 48 and drive sprocket 44 and moves drive sprocket 44 up and down on shaft 46 as drill bar 30 moves up and down. This keeps chain 55 and all chain sprockets 34, 44, and 48 in the same plane above drill bar 30, during its vertical movement.

Slug rods 32, with heads 33, extend vertically downward through frame 20 and through each hollow spindle 35 to a position near the drilling tips 41 of drill bits 40, when drill bar 30 is in its uppermost position. Each slug rod 32 can be raised out of operating position and held in an elevated position by a set screw 31, when not in use. Otherwise, loosening a set screw 31 lets a slug rod 32 drop to its lowermost position, with its head 33 resting on frame 20, so as to push drilled out slugs of material out of the bottoms of drill bits 40, when drill bar 30 raises.

To operate drill 10, the operator presses two switches 28 at the front of platform 11 to actuate air cylinders 17 and move drill bar 30 downward. As drill bar 30 moves downward, an actuator 39 actuates a switch 38 to start motor 45 turning, for driving chain 55 and rotating spindles 35 and their drill bits 40. When the operator releases switches 28, cylinders 17 raise drill bar 30, causing switch 38 to stop motor 45. When the drill is shut off, air cylinders 17 gradually lower drill bar 30 until the drilling tips 41 of drill bits 40 touch the work surface 116 on table 15. This can be used to adjust the height of a collar 42 on a newly sharpened drill bit 40.

A presser foot 54, mounted underneath drill bar 30, is urged downward by compression springs 53. Presser foot 54 has a notch 52 around each drill bit 40 and extends slightly below drilling tips 41. As drill bar 30 moves downward, presser foot 54 is first to engage a negative or flexographic plate and hold the work piece under the pressure of springs 53 as drill bits 40 drill downward.

A single negative 50 or a set of negatives 50, corresponding to the different colors for a job to be printed, can be mounted on pins 26 of pin bar 25, via holes 27 punched in each negative 50. Pin bar 25, with negatives 50, is then positioned laterally in the X direction on table 15, until a suitable region outside of image area 51 registers with several drill bits 40. Table 15 can be moved in the Y direction for this alignment purpose; and when negatives are properly positioned, clamps 12 and 24 are locked to fix the negatives in place.

Figure 9:
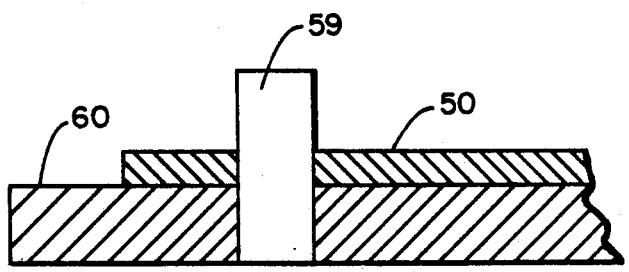
FIG. 9 is an enlarged, cross-sectional view of a flexographic plate and negative pinned together via a hole array drilled according to my invention.
Figure 7:
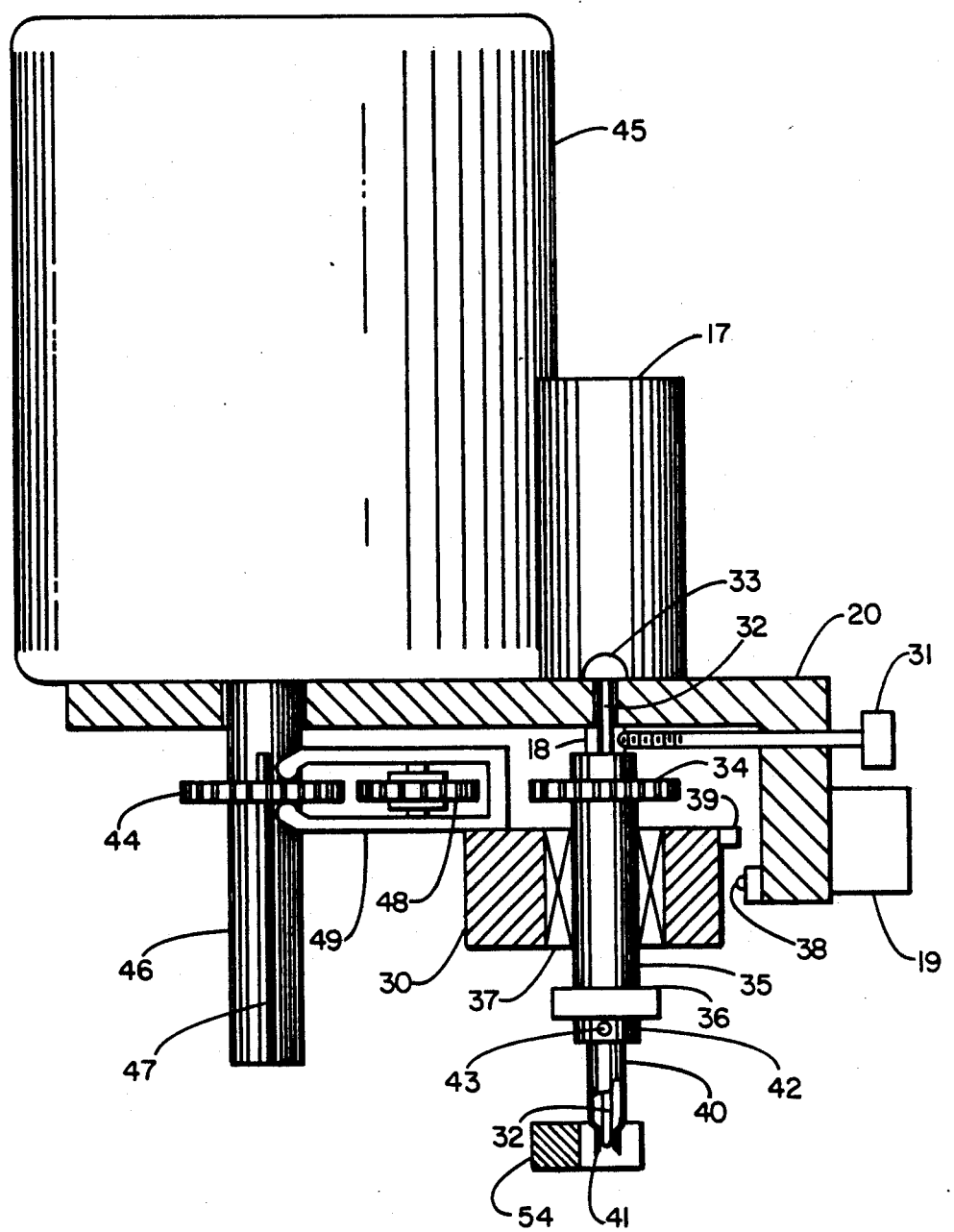
FIG. 7 is a partially schematic, cross-sectional view of the drill bar and frame, with the drive chain removed.

An array of holes 56 is then drilled in the negatives, simply by actuating switches 28. The drills used for the hole array are recorded for the job involving the drilled negatives 50, and the same array of holes 56 is then drilled in a flexographic plate 60 corresponding to each negative 50. Pins 59, extending through the drilled holes 56, are used for pinning each negative 50 to a corresponding plate 60, as shown in FIG. 9. While the negatives and plates are pinned together, the plates are imaged in the pattern of the negatives and are prepared for mounting on a print cylinder 65. This is preferably done by means of a pin bar 61 having pins 66 that match the holes 56 drilled in plate 60. My copending application Ser. No. 095,960, filed 14 September 1987, now U.S. Pat. No. 4825558 entitled Pin Bar For Mounting Flexographic Printing Plates, the disclosure of which is hereby incorporated by reference, describes a pin bar that I prefer for this purpose.

Since pin bar 61 is held parallel with the axis of cylinder 65, during the mounting of a plate 60, and since hoels 56 drilled in the plate are square with the image area 51 (because the negative 50 was squared on drill table 15 by pin bar 25), the image area of plate 60 is mounted accurately square with cylinder 65. This assures that plate 60 operates in registry, in a flexographic press.

Many substitutions can be made in drill 10. For example, spindles 35 can be rotated by motors or belts, instead of by the preferred chain drive. Drills 40 can be mounted in spindles 35 by means of chucks or other holding devices, and different mechanisms can raise and lower drill bar 30. Any suitable arrangement of components preferably holds negatives 50 squarely on table 15 so that holes 56 are square to the image area, enabling registry of plates 60 on cylinders 65.

I claim:

1. A drill for flexographic plates and negatives, said drill comprising:
   a. a linear array of drill bits rotatably
   b. a bearing system supporting said table for movement in a Y direction underneath said drill bar;
   c. a clamp for clamping said table in a Y direction position;
   d. a pin bar having upstanding pins fitting said plates and negatives, said pin bar being mounted in a recess in said table so that said plates and negatives rest on said table when mounted on said pins of said pin bar and said pin bar being movable along said recess relative to said table in an X direction;
   e. a clamp for locking said pin bar to said table in an X direction position along said recess; and
   f. a motor system for raising and lowering said drill bar and for rotating said drill bits for drilling a selected array of holes in said flexographic plates and negatives supported on said table.

2. The drill of claim 1 wherein said drill bits are clamped in spindles, and each of said drill bits has an adjustable collar abutting against a respective one of said spindles for setting a uniform depth for said drill bits.

3. The drill of claim 1 wherein said drill bits are hollow and are clamped in hollow spindles, and slug removal rods extend downward through said spindles and said drill bits for removing slugs from inside of said drill bits when said drill bar raises from drilling a work piece.

4. The drill of claim 3 wherein said rods are vertically movable and are supported in a fixed drill bar frame relative to which said drill bar moves vertically.

5. The drill of claim 1 including a drill motor driving a sprocket and a chain wrapped in alternate directions around drill spindle sprockets for counterrotating adjacent ones of said drill bits.

6. The drill of claim 1 including a spring-biased pressure foot arranged below said drill bits for engaging and holding said flexographic plates and negatives before said drill bits contact said flexographic plates and negatives.

7. The drill of claim 1 including a switch arranged for actuating said drill motor as said drill bar moves downward.

8. The drill of claim 1 wherein a platform underneath said table supports said bearing system for said table.

9. The drill of claim 1 wherein posts extend above opposite sides of said table to a drill bar frame fixed over said table, and a motor system is mounted on said drill bar frame for moving said drill bar up and down.

10. The drill of claim 9 including a drill motor mounted on said drill bar frame for driving a sprocket and a chain movable with said drill bar, said chain being wrapped in alternate directions around drill spindle sprockets for counterrotating adjacent ones of said drill bits.

11. The drill of claim 10 including a switch arranged for actuating said drill motor as said drill bar moves downward.

12. The drill of claim 10 wherein said drill bits are clamped in spindles, and each of said drill bits has an adjustable collar abutting against a respective one of said spindles for setting a uniform depth for said drill bits.

13. The drill of claim 9 wherein said drill bits are hollow and are clamped in hollow spindles, and slug removal rods, mounted on said drill bar frame, extend downward through said spindles and said drill bits for removing slugs from inside of said drill bits when said drill bar raises from drilling a work piece.

14. A drill bar for flexographic negatives and plates, said drill bar comprising:
    a. a linear array of spaced apart drilling spindles, each of said drilling spindles being hollow and having a drill clamp arranged at a common height;
    b. hollow drills shaped for clamping into said spindles, each of said drills having a collar arranged at an equal distance from a drilling tip so that said collars can abut against said spindles and position said drilling tips at a common height;
    c. slug rods mounted to extend downward through said spindles and said drills for removing drilled out slugs from the insdies of said drills; and
    d. said spindles having chain sprockets, and a drive chain meshed with said sprockets for rotating said spindles in unison.

15. The drill bar of claim 14 wherein said chain is wrapped in alternate directions around said spindle sprockets so that adjacent spindles rotate in opposite directions.

16. The drill bar of claim 14 including a frame supporting said drill bar for vertical movement, and a motive system mounted on said frame for raising and lowering said drill bar.

17. The drill bar of claim 16 wherein said slug rods are vertically adjustable on said frame for removing said drilled out slugs when said drill bar rises.

18. The drill bar of claim 14 including a drill motor mounted on said frame for turning a drive sprocket meshed with said chain and vertically movable with said drill bar.

19. The drill bar of claim 14 including a spring-loaded pressure foot mounted on said drill bar to precede said drills into engagement with said flexographic negatives and plates.

20. A drill table for flexographic plates and negatives, said drill table comprising:
    a. a platform supporting a bearing system;
    b. a table supported by said bearing system for movement in a Y direction;
    c. a clamp for clamping said table in a Y direction position;
    d. a plate and negative-holding pin bar mounted in a recess in said table and movable in an X direction within said recess relative to said table, said pin bar having a row of upstanding pins extending above an upper surface of said table so that a plate or negative having holes mounted on said pins on said pin bar rests on said upper surface of said table; and
    e. a clamp for clamping said pin bar to said table in an X direction position within said recess so that plates and negatives mounted on said pin bar and resting on said table are movable in a Y direction with said table and in an X direction with said pin bar in said recess so that said plates and negatives can be fixed in a selected position relative to a linear array of drills arranged above said table for drilling an array of holes in non-image areas of said negatives and in flexographic plates to be imaged by said negatives.

21. The drill table of claim 20 including a drillable layer on an upper surface of said table.

* * * * *